Figure 1:
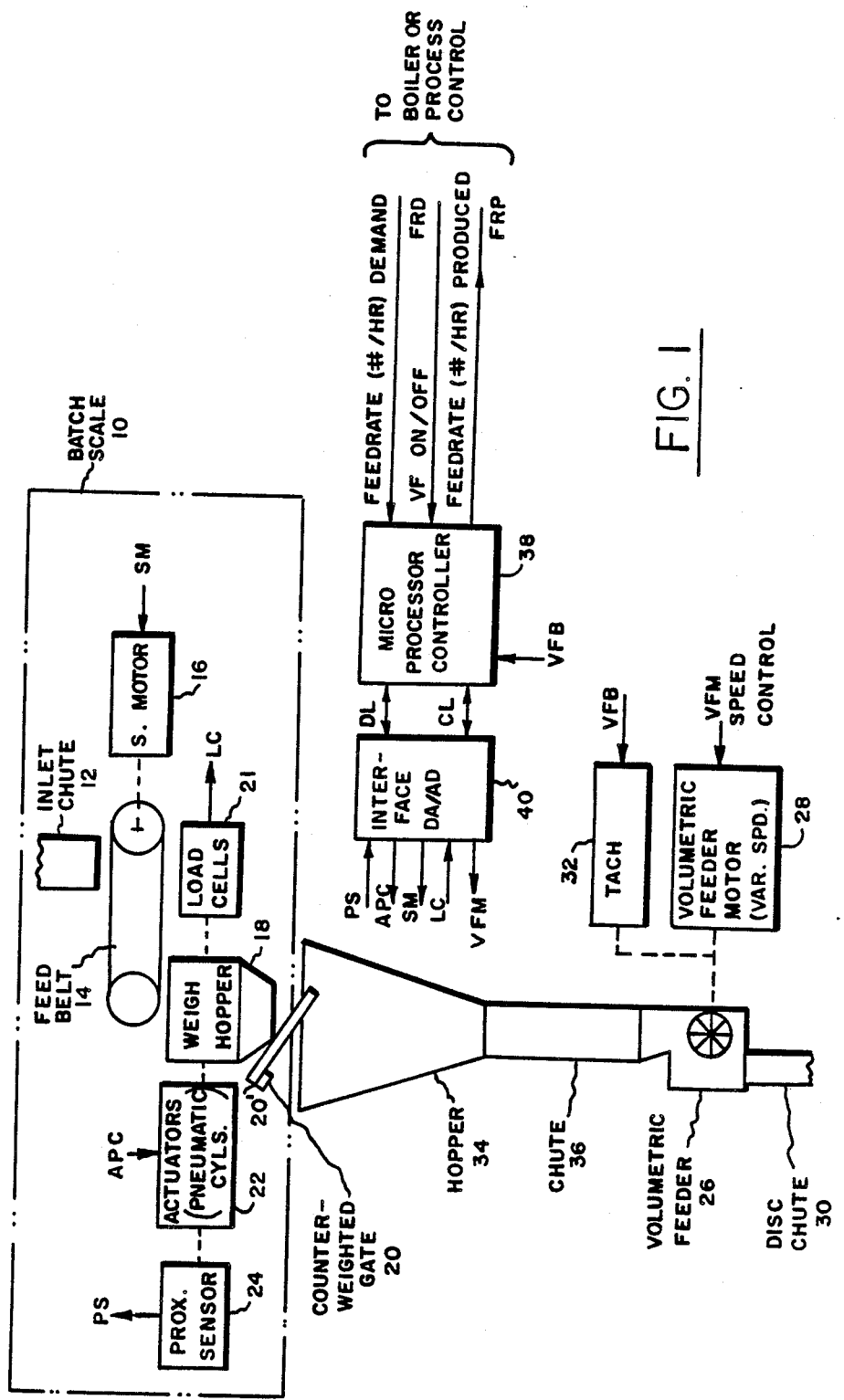

United States Patent [19]

Krauss

[11] Patent Number: 4,793,512

[45] Date of Patent: Dec. 27, 1988

[54] APPARATUS AND METHOD FOR FEEDING PARTICULATE MATERIAL SUCH AS COAL AND OTHER BULK MATERIALS

[75] Inventor: Kenneth J. Krauss, Fairview Park, Ohio

[73] Assignee: Stock Equipment Copy, Chagrin Falls, Ohio

[21] Appl. No.: 769,055

[22] Filed: Aug. 26, 1985

[51] Int. Cl.$^4$ .................................. G01G 13/24
[52] U.S. Cl. ................................ 222/1; 222/55; 222/56; 222/77
[58] Field of Search .......................... 222/55–56, 222/59, 63, 77, 1

[56] References Cited

U.S. PATENT DOCUMENTS

| | | | |
|---|---|---|---|
| 2,714,472 | 8/1955 | Richardson | 222/63 |
| 2,983,325 | 5/1961 | Moody | 222/63 X |
| 3,001,672 | 9/1961 | Wahl | 222/55 X |
| 3,187,944 | 6/1965 | Stock | 222/25 |
| 3,967,758 | 7/1976 | Ferrara | 222/58 |
| 4,257,518 | 3/1981 | Stock et al. | 222/55 X |
| 4,272,824 | 6/1981 | Lewinger et al. | 222/56 X |
| 4,498,783 | 2/1985 | Rudolph | 222/56 X |

Primary Examiner—Charles A. Marmor
Attorney, Agent, or Firm—Martin LuKacher

[57] ABSTRACT

A batch scale weighs the particulate material and delivers it periodically to a volumetric feeder through a hooper. A computer controller responsive to a feeding rate demand signal, the length of the period during which each batch is delivered from the scale, and the speed of the volumetric feeder, provides outputs indicating the feed rate produced by the volumetric feeder and can control the speed of the feeder to obtain the demanded feed rate. The result is that the material is fed at a feed rate in terms of units of weight per units of time, and the volumetric feeder is converted, by the addition of the batch scale and the computer controller, into a gravimetric feeder.

16 Claims, 4 Drawing Sheets

APPARATUS AND METHOD FOR FEEDING PARTICULATE MATERIAL SUCH AS COAL AND OTHER BULK MATERIALS

DESCRIPTION

The present invention relates to apparatus and methods for feeding particulate materials, such as coal and other bulk materials, and particularly to improved methods and apparatus for feeding material gravimetrically (on a unit weight per unit time basis) with a volumetric feeder, thereby converting the volumetric feeder into a gravimetric feeder.

The invention is especially suitable for use in converting volumetric feeders into gravimetric feeders so as to enable coal and other particulate material to be fed by weight and eliminate variations due to density changes in the material to improve efficiency in the operation of coal fired boilers. The invention is also suitable for use in initial installations during new construction and capital equipment improvements in plants and facilities.

Volumetric feeder conversion to gravimetric feeding has involved the replacement of the volumetric feeder with a gravimetric feeder, for example such as described in U.S. Pat. Nos. 3,187,944 issued to A. J. Stock on June 8, 1965 and 4,257,518 issued to A. J. Stock et al on Mar. 24, 1981. It has been discovered, in accordance with this invention that a volumetric feeder may be converted to feed gravimetrically by the delivery thereto of the material in weighed batches, particularly from a batch scale, where the period of the delivery of the batches and the speed of the volumetric feeder are sensed together with the weight of the batches and used to derive outputs representing the feed rate on a gravimetric basis (unit weight per unit time). The volumetric feeder speed can be controlled so as to produce a feed rate in accordance with a demand signal, for example from the boiler or other process which utilizes the material discharged from the feeder.

While feed rate control of devices which feed by volume have been proposed (see, U.S. Pat. Nos. 2,714,472 issued Aug. 2, 1955 and 3,001,672 issued Sept. 26, 1961), precise gravimetric feeding over a wide range of feed rates has not been accomplished. The invention overcomes the problem of providing wide feed rate range and accuracy of control, by continuously monitoring the volumetric efficiency of the volumetric feeder and correcting of the variation in the volumetric efficiency of the volumetric feeder. The volumetric efficiency factor is the ratio of the weight of the material to the speed of the feeder. In accordance with this invention, the volumetric efficiency factor is computed for each batch of material feed into the volumetric feeder from the batch scale feeder, and used to correct a stored volumetric efficiency factor. The correct volumetric efficiency is used to compute the feed rate and to control the volumetric feeder speed so that the feed rate can be changed to correspond to a demanded feed rate from the process (the boiler) which is using the material discharged from the volumetric feeder.

Accordingly, it is the principal object of the present invention to provide improved methods and apparatus for converting a volumetric feeder into a gravimetric feeder.

It is another object of the present invention to provide improved feeder apparatus which may utilize a volumetric feeder of the type which is generally available and in use in facilities for feeding particulate material, such as coal fired electric power plants, together with a batch scale and computer control unit, to enable the volumetric feeder to feed on a weight or gravimetric basis.

It is a still further object of the present invention to provide improved apparatus for feeding particulate material gravimetrically, which incorporates a volumetric feeder and may be used instead of a complete replacement of the volumetric feeder with a gravimetric feeder, when it is desired to feed the material by weight, instead of by volume.

Figure 2A:
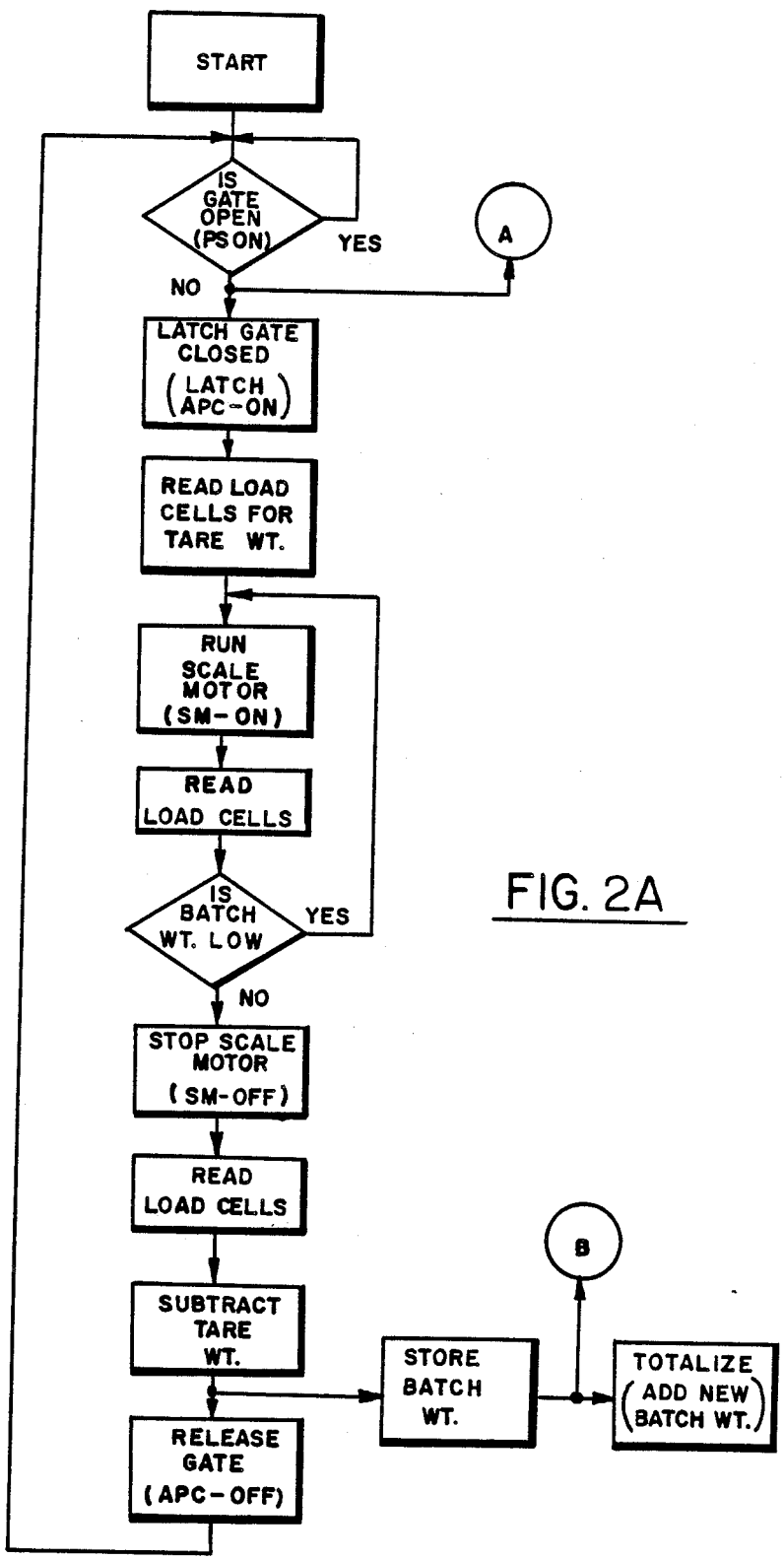
Figure 2B:
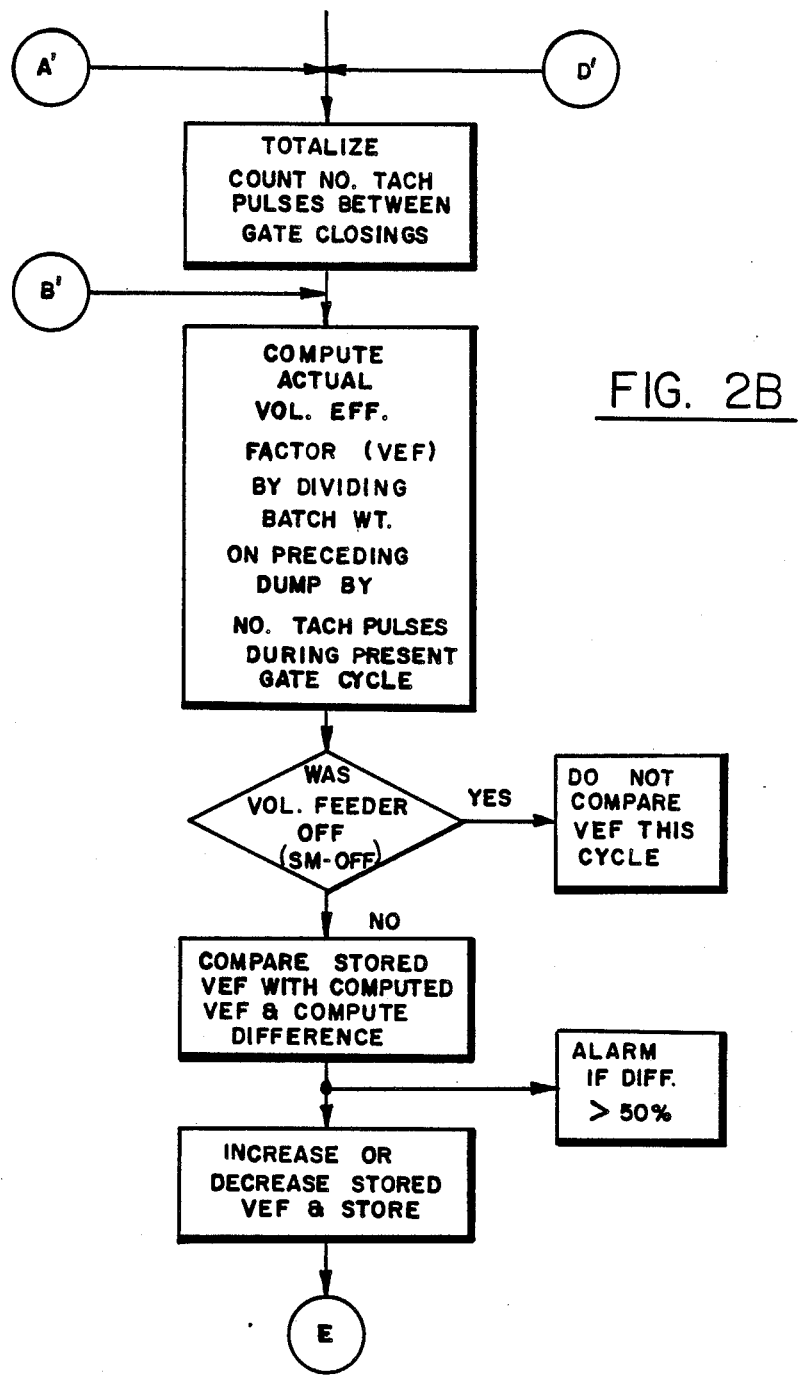
Figure 2C:
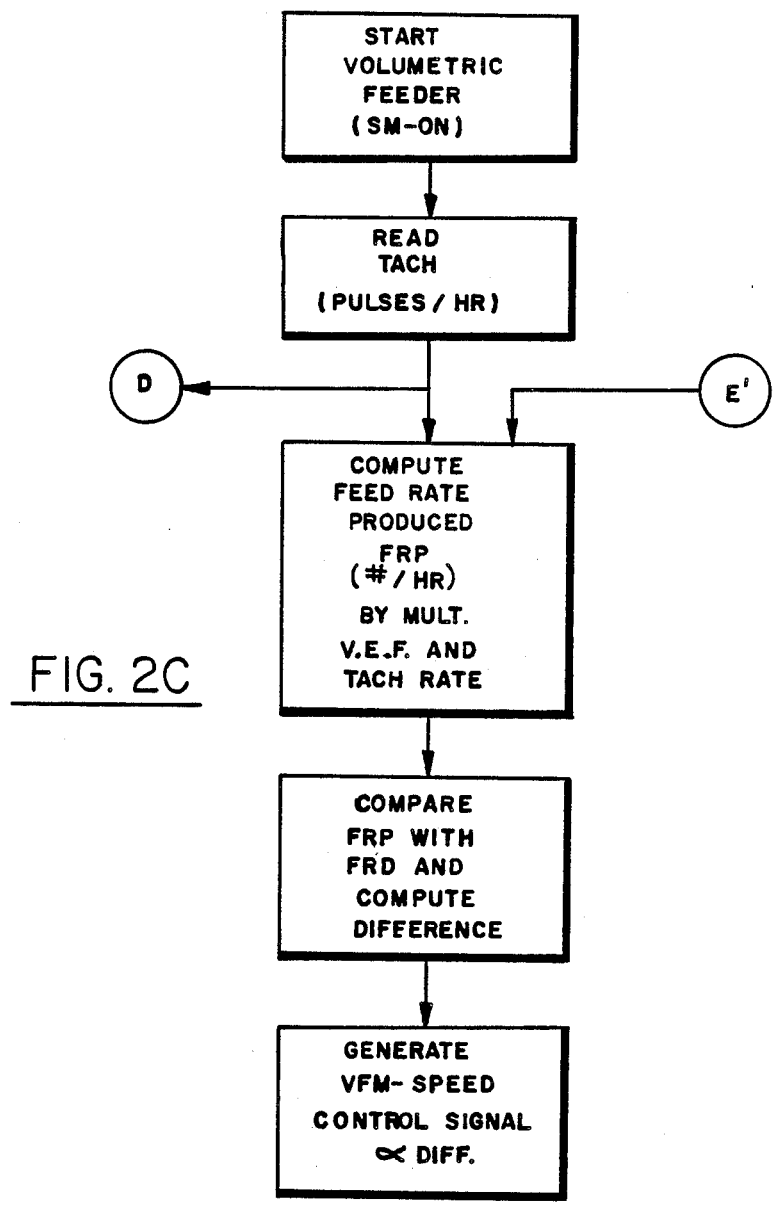

The foregoing and other objects, features and advantages of the invention as well as a presently preferred embodiment thereof will become more apparent from a reading of the following description in connection with the accompanying drawings in which:

FIG. 1 is a schematic diagram illustrating apparatus for feeding particulate material in accordance with a presently preferred embodiment of the invention; and FIGS. 2A, 2B and 2C, taken together, constitute a flowchart illustrating the programming of the computer control unit (microprocessor controller) and the operation of the apparatus illustrated in FIG. 1.

Referring more particularly to FIG. 1 of the drawings there is shown a batch scale 10. This scale is a batch feeder which weighs the material being fed and discharges it in batches. The batch scale may be a Model 84 Microprocessor Batch Scale which is sold by the Stock Equipment Company, Chagrin Falls, Ohio 44022-4398 U.S.A. The batch scale has an inlet chute 12 which may be connected to a bunker for the coal or other particulate material which is to be fed. The bunker is not shown to simplify the illustration. The material is discharged from the chute 12 onto a feed belt conveyor 14. The conveyor is driven by a motor 16 indicated as a S.MTR or scale motor. The feed belt when the motor is on as determined by a control signal SM, drops the material into a weigh hopper 18 which may be mounted on load cells 21. The discharge end of the hopper is closed by a counterweighted gate 20. Other gates or valves may be used to control the discharge and the terms "gate" is intended to encompass such gates, valves or other equivalent devices.

Actuators, in the form of pneumatic cylinders 22 are retracted when the gate 20 is closed and may be locked into closed position in response to a control signal, APC, to the actuators 22. When the signal APC is removed the gate is released and allows the discharge of the material from the weigh hopper 18. Each opening and closing of the gate 20 is sensed by a proximity sensor 24 which may be located to respond to the position of the pneumatic cylinders of the actuators 22. Upon each closing a output signal PS is produced. The period between PS signals is a measure of the time for the discharge or dump of a batch from the weigh hopper, and therefore the rate of discharge from the batch scale.

The apparatus uses a volumetric feeder 26. This feeder may be a table, drag, screw auger, pocket, or belt feeder. It is illustrated diagrammatically as a pocket feeder with a series of revolving bins which are turned by the volumetric feeder motor 28. This motor is a variable speed motor and responds to a speed control signal VFM. The material fed by the volumetric feeder 26 is discharged to a discharge chute 30 to the boiler or other process utilizing the material. The speed of the feeder is sensed by a tachometer 32 which is connected to the shaft of the motor 28. The tachometer provides output pulses VFB in a pulse train. The repetition rate of the pulses is a measure of the speed of the volumetric feeder.

The batches of material which are discharged from the weigh hopper 18 drop into a hopper 34 and through a chute 36 into the volumetric feeder. As the chute and hopper fill, the material piles up on the gate 20 and prevents the gate from pivoting in response to the weight of its counterweight 20' to the closed position. The material must be fed by the volumetric feeder in order to clear the hopper sufficiently to allow the gate 20 to close. The cycle can then start again with the gate opening to dump another load of material into the hopper 34.

It will be seen, therefore, that the efficiency of the volumetric feeder 26 corresponds in part to the period between openings of the gate (the rate at which the gate opens). This period is provided by the interval between the PS signals from the proximity sensor 24 and is used together with the output LC of the load cells 21 which indicate the weight of the material which is dumped, to measure the volumetric efficiency factor of the feeder 26 and control the feeder 26 so that it feeds by weight (gravimetricly).

A computer control unit, which is preferably a microprocessor controller 38, is connected by control lines (CL) such as address lines and data lines (DL) to an interface unit 40 containing digital to analog and analog to digital converters. The interface unit provides the VFM, SM and APC signals and receives the PS and LC signals. The VFB signals (the tachometer pulses) are also applied to the microprocessor controller 38 and may be a direct digital input. The controller produces an output indicating the feed rate produced (FRP) in pounds per hour to the boiler or other process control unit. This process control unit provides inputs for turning the entire feeder on and off (VF on/off) and a feed rate demand signal (FRD).

Referring to FIGS. 2A, 2B and 2C, when the VF signal is on, the apparatus is started as indicated in the block identified with the word start in FIG. 2A. If the gate 20 is open, as indicated by the PS output the system waits until the gate closes and the APC signal is applied to the actuators 22 to latch the gate closed. The load cells are then read to obtain the tare weight. Then the scale motor is started by applying SM command signal. The load cells are continually read so long as the batch weight remains low (below a predetermined weight). When the batched weight exceeds the predetermined weight (and preferably slightly below the predetermined weight is achieved in order to allow for the inertia in the feed belt), the scale motor 16 is stopped. The load cells continue to be read. The tare weight is subtracted from the weight read by the load cells and the batch weight is read. Then the APC signal is turned off to release the gate 20 and the material is dumped into the hopper 34. This process repeats and the batch weights may be totalized by adding each batch weight to the total so as to provide an indication of the amount of material which is discharged from the apparatus.

The flow chart diagrams of FIGS. 2A, 2B and 2C are connected by way of connectors, A to A' and B to B' and so forth, as is conventional in flow charting.

The closings of the gate 20 is sensed, as is the tachometer 32 and the number of tachometer or tach pulses between gate closings is totalized (see FIG. 2B). The actual (real time) volumetric efficiency factor (VEF) is computed by dividing the stored batch weight on the preceding dump by the number of tach pulses totalized during the present gate cycle. This delay allows for the passage of the material into the volumetric feeder and takes into account the volumetric feeding efficiency of the the dump or batch being fed.

If the volumetric feeder is turned off (the SM signal to the scale motor being off), then the total of the tach pulses is inhibited and the volumetric efficiency factor is not computed. This takes into account the possibility that a dump may have occurred on a preceding cycle from material which was not then being fed on a real time basis into the weigh hopper 18. A volumetric efficiency factor number is stored in memory in the microprocessor 38. This stored factor is compared with the computed or actual volumetric efficiency factor and the difference is computed. If the difference is greater than fifty percent, this is an indication of a malfunction in the feeder and an alarm is sounded. For smaller variations between the stored and actual VEF, the stored VEF is incremented or decremeted so that the actual VEF is updated and is present in memory.

This actual VEF is used together with the tach pulses to compute the actual feed rate which is produced (FRP) as shown in FIG. 2C. The pulses per hour are multiplied by the volumetric efficiency factor which is in units of pounds per pulse so as to provide the feed rate output FRP in pounds per hour. This is the FRP output from the microprocessor controller 38 as shown in FIG. 1.

In the event that it is desired to control the system to provide the demanded feed rate, the feed rate demand signal FRD is compared with the computed feed rate FRP and the difference is computed. This difference is used to generate the VFM speed control signal which is proportional thereto. The speed of the volumetric feeder is then increased or decreased to obtain the demanded feed rate.

From the foregoing description it will be apparent that there has been provided improved methods and apparatus for feeding of particulate material, and particularly an improved method and apparatus for converting a volumetric feeder into a gravimetric feeder. While an exemplary embodiment of the invention has been described, variations and modifications therein, within the scope of the invention, will undoubtedly become apparent to those skilled in the art. Accordingly the foregoing description should be taken as illustrative and not in a limiting sense.

I claim:

1. Apparatus for feeding particulate materials, such as coal, at a feed rate in terms of weight per unit time of the materials, which comprises variable speed means for feeding said materials by volume, which volume varies in accordance with the speed of said volume feeding means, means for feeding weighed batches of said material to said volume feeding means, means responsive to the periods during which said batches are fed to said volume feeding means and the speed of said volume feeding means for providing an output representing the feed rate of said material from said volume feeding means in units of weight per units of time, said output providing means comprising means for computing a volumetric efficiency factor of said volume feeding means corresponding to the ratio of the weights of successive ones of the batches and the speed of the volume feeding means during the periods of the feeding of said batches, and means for computing said output in accordance with the product of said volumetric efficiency factor and said speed of said volumetric feeding means.

2. The apparatus according to claim 3 further comprising means for controlling the speed of said volume feeding means until said output corresponds to a demanded feed rate.

3. The apparatus according to claim 1 wherein said computing means comprises means for measuring the weight of each of said batches before the feeding thereof by said volume feeding means and measuring the speed of said volume feeding means while each of said weight measured batches is fed to said volume feeding means.

4. The apparatus according to claim 3 further comprising means disposed between said batches feeding means and said volume feeding means for accumulating said batches.

5. The apparatus according to claim 4 wherein said accumulating means includes a first hopper disposed above said volume feeding means, said batch feeding means includes a weigh hopper having a lower end disposed above said first hopper and a gate which closes said end and extends into said first hopper when opened and is inhibited from closing when a sufficient amount of said batches of said material is accumulated in said first hopper to engage said gate.

6. The apparatus according to claim 5 further comprising means for sensing the openings and closings of said gate in said output providing means for providing the response to the period during which said batches are fed.

7. The apparatus according to claim 6 further comprising tachometer means responsive to the speed of said volume feeding means for providing pulses at a rate corresponding to the speed of said volume feeding means.

8. The apparatus according to claim 7 wherein said output providing means further comprises means for counting the number of said pulses between successive ones of said gate closings.

9. The apparatus according to claim 8 further comprising means for measuring the weight of said material in said weigh hopper before each of said openings of said gate, and means for dividing each weight measured by said measuring means after to each closing of said gate by each number of pulses counted from the occurrence thereof to the occurrence of the next closing of said gate to provide said volumetric efficiency factor.

10. The apparatus according to claim 9 wherein said batches feeding means is a batch scale and said volume feeding means is a volumetric feeder.

11. The apparatus according to claim 9 wherein said output providing means comprises a programmed digital computer having inputs from said weight measuring means, said opening sensor means and said tachometer means and providing outputs to said volume feeding means to control the speed thereof and to indicate said output corresponding to the feed rate of said material from said volume feeding means.

12. The apparatus according to claim 11 wherein said computer has an input for a signal corresponding to the feed rate demanded from said apparatus, and said microprocessor has means responsive to said output and said feed rate demanded signal for varying said speed control output until said feed rate produced output corresponds to said feed rate demanded signal.

13. The method of feeding particulate material with a volumetric feeder and a batch feeder to provide gravimetric feeding at a feed rate in terms of weight of said material per unit time which comprises the steps of delivering weighed batches of said material from said batch feeder to said volumetric feeder, sensing the periods during which said batches are delivered to said volumetric feeder, sensing the speed of said volumetric feeder during said periods, computing the volumetric efficiency factor of said volumetric feeder in terms of the ratio of the weights of said batches to the speed of said volumetric feeder, and computing said feed rate as the product of the speed of said volumetric feeder and said factor.

14. The method according to the claim 13 further comprising the steps of comparing said feed rate with a demanded feed rate and controlling said speed until said demanded feed rate is obtained.

15. Gravimetric feeder apparatus which comprises a batch feeder having a hopper with input and delivery ends and in which amounts of material which are introduced at the input end are contained, said hopper having a gate at the delivery end thereof, a volumetric feeder, means for gravity feed of said material from said hopper of said batch feeder to said volumetric feeder including a delivery hopper disposed adjacent to said gate, means for sensing each opening of said gate, means for sensing the weight of said material in said hopper of said batch feeder prior to each opening, means for sensing the speed of said volumetric feeder, and computer means responsive to weight sensed by said weight sensing means and the speed of said volumetric feeder between successive closings of said gate for generating a volumetric efficiency factor of said volumetric feeder in terms of the ratio of said weight to the speed of said volumemetric feeder and for providing an output representing the feed rate of said material in terms of weight per unit time corresponding to the product of said factor and the speed of said volumetric feeder.

16. The feeder according to claim 15 further comprising means operated by said computer means for controlling the speed of said volumetric feeder to obtain demanded feed rates.

* * * * *